United States Patent [19]

Hosono

[11] Patent Number: 5,079,634
[45] Date of Patent: Jan. 7, 1992

[54] APPARATUS FOR WIRELESS-CONTROLLING A CAMERA AND APPARATUS FOR TWO-DIRECTION SIMULTANEOUS CONTROL OF ELECTRICALLY-DRIVEN EQUIPMENT

[75] Inventor: Masataka Hosono, Yokohama, Japan

[73] Assignee: Alps Electric Co., Ltd., Tokyo, Japan

[21] Appl. No.: 668,576

[22] Filed: Mar. 13, 1991

[30] Foreign Application Priority Data

Mar. 15, 1990 [JP] Japan ................................. 2-66377

[51] Int. Cl.$^5$ .............................................. H04N 5/30
[52] U.S. Cl. .................................. 358/210; 358/185; 358/108; 358/125
[58] Field of Search ................... 358/210, 194.1, 185, 358/209, 186, 125, 126, 108; 340/825.69; 341/176

[56] References Cited

U.S. PATENT DOCUMENTS

| | | | |
|---|---|---|---|
| 4,019,180 | 4/1977 | Graves | 358/210 |
| 4,123,782 | 10/1978 | Kitahara | 358/185 |
| 4,450,487 | 5/1984 | Koide | 358/210 |
| 4,716,465 | 12/1987 | Meyer | 358/210 |
| 4,974,088 | 11/1990 | Sasaki | 358/210 |
| 5,012,335 | 4/1991 | Cohodar | 358/108 |

Primary Examiner—Howard W. Britton
Assistant Examiner—Sherrie Hsia
Attorney, Agent, or Firm—Guy W. Shoup; B. Noël Kivlin

[57] ABSTRACT

An apparatus for wireless-controlling a camera and for two-direction simultaneous control of an electrically-driven pan head on which the camera is mounted, including a camera-side transmitter-receiver for modulating and transmitting an image signal from the camera and pulse data on the state of the camera, receiving and demodulating the signal transmitted from an operating-side transmitter-receiver, and supplying the demodulated signal to the camera and the pan head; and the operating-side transmitter-receiver for modulating and transmitting control signals based on an input from a control input section, receiving and demodulating the signal from the camera-side transmitter-receiver, and supplying the demodulated signal to an operating-side display. First-direction and second-direction control signals are input through the control input section. A two-direction detector outputs a detection signal when the first-direction and second-direction control signals are simultaneously output. A time-division clock oscillator produces time-division clock when supplied with the detection signal. A tone pulse oscillator receives the first-direction and second-direction control signals, and outputs tone pulse signals corresponding to the control signals in synchronization with the time-division clock. A tone pulse signal discriminator receives the tone pulse signals, and supplies the electrically-driven device with control voltages according to the tone pulse signals.

2 Claims, 5 Drawing Sheets

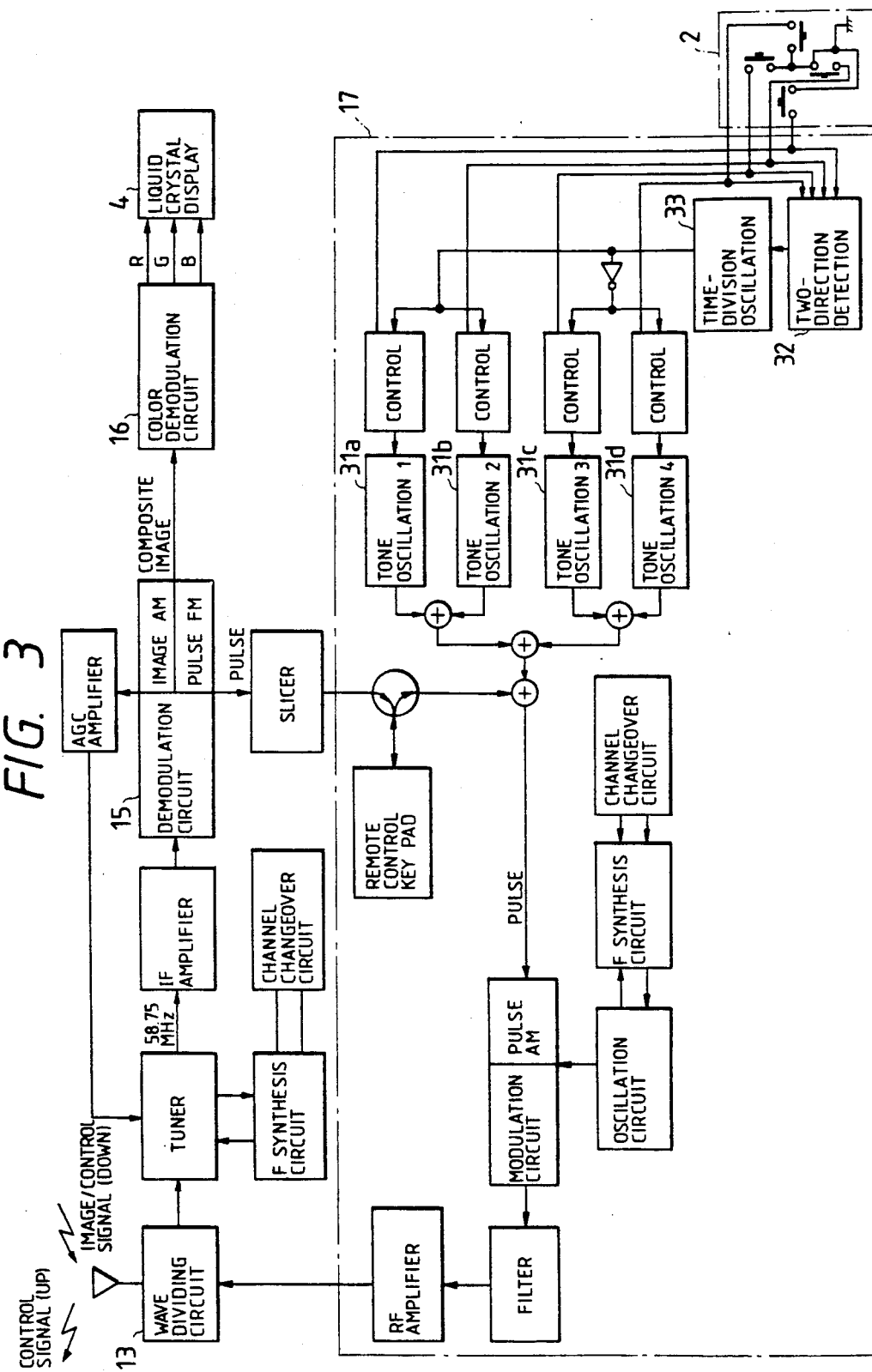

APPARATUS FOR WIRELESS-CONTROLLING A CAMERA AND APPARATUS FOR TWO-DIRECTION SIMULTANEOUS CONTROL OF ELECTRICALLY-DRIVEN EQUIPMENT

BACKGROUND OF THE INVENTION

This invention relates to an apparatus for wireless-controlling a camera integral with a VTR and an apparatus for two-direction simultaneous control of an electrically-driven device for use with this camera wireless control apparatus. More particularly, this invention relates to a camera wireless controller and an apparatus for two-direction simultaneous control of an electrically-driven device which can wireless-control a camera and an electrically-driven pan head and which enable two-direction simultaneous control of an electrically-driven device such as an electrically-driven pan head.

Cameras integral with VTRs have been diffused remarkably in recent years. However, it is impossible for the operator to take a picture of him- or herself by using this type of camera alone, and the operator must chase the object while holding the camera, if the object moves around. Recently, therefore, a type of camera system has been used in which a camera integral with a VTR is mounted on an electrically-driven pan head with a cable remote controller and is operated through the cable.

A camera integral with a VTR used with such an electrically-driven pan head with a cable remote controller, however, entails the problem of various restrictions on its use owing to the existence of the cable. In particular, shooting in a situation where the human operator cannot approach the object, e.g., at the time of bird-watching, a long control cable is required which is inconvenient in terms of handling. Also, the camera with VTR cannot be rotated many times in one direction because the cable is entangled.

SUMMARY OF THE INVENTION

In view of these problems, an object of the present invention is to provide an apparatus for wireless-controlling a camera and an apparatus for two-direction simultaneous control of an electrically driven device which can wireless-control the camera and an electrically-driven pan head and which enable two-direction simultaneous control of an electrically-driven device such as an electrically-driven pan head.

Another object of the present invention is to eliminate the operator's feeling of uneasiness due to a situation of being unable to ascertain, while wireless-controlling the camera from a distance, the state of the camera, for example, the remaining battery energy or the amount of remaining tape, or whether or not the camera is moving in accordance with a control signal transmitted from the wireless controller to the camera, for example, to start or stop video recording.

To achieve these objects, according to one aspect of the present invention, there are provided an apparatus for wireless-controlling a camera and an apparatus for two-direction simultaneous control of an electrically-driven device, including:

a camera-side transmitter-receiver for modulating and transmitting an image signal from the camera and pulse data on the state of the camera, receiving and demodulating a signal transmitted from an operating-side transmitter-receiver, and supplying the signal demodulated to the camera and an electrically-driven pan head on which the camera is mounted; and the operating-side transmitter-receiver for modulating and transmitting a control signal based on an input from a control input section, receiving and demodulating a signal transmitted from the camera-side transmitter-receiver, and supplying the signal demodulated to a display on the operating side.

According to another aspect of the invention, the apparatuses also include:

a control input section for outputting a first-direction control signal and a second-direction control signal;

two-direction detection means for outputting a detection signal representing that the first-direction and second-direction control signals are simultaneously output from the control input section, when this situation occurs;

a time-division clock oscillator for oscillating time-division clock when supplied with the output from the two-direction detection means;

a tone pulse oscillator supplied with the first-direction and second-direction control signals from the control input section, the tone pulse oscillator outputting tone pulse signals corresponding to the supplied control signals in synchronization with the clock from the time-division clock oscillator; and tone pulse signal discrimination means supplied with the tone pulse signals from the tone pulse oscillator, the tone pulse signal discrimination means supplying the electrically-driven device with control voltages corresponding to the supplied tone pulse signals.

By the above-described means, the operating-side transmitter-receiver receives the signal from the camera-side transmitter-receiver, and displays on the display unit an image imaged by the camera integral with the VTR, the amount of battery energy, the mount of remaining tape and so on. The operator inputs control signals by operating the control input section while observing the display on the display unit. The camera-side transmitter-receiver supplies the camera and the display unit with the control signals from the operation-side transmitter-receiver. The display unit is thereby driven and the camera is operated as desired.

According to the second aspect of the invention, when both the two control signals, i.e., the first-direction and the second-direction control signals are output from the control input section, tone pulse signals corresponding to the two control signals are alternately oscillated in synchronization with the time-division clock, and control voltages are supplied to the electrically-driven device in correspondence with these tone pulse signals alternately oscillated, thereby enabling two-direction simultaneous control of the electrically-driven device.

BRIEF DESCRIPTION OF THE DRAWINGS

FIG. 3 is a block diagram of the camera-side unit of the embodiment;

DESCRIPTION OF THE PREFERRED EMBODIMENT

An embodiment of the present invention will be described below with reference to the accompanying drawings.

Figure 1A:
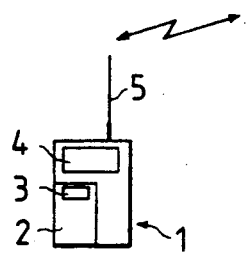
FIGS. 1(*a*) and 1(*b*) are system conception diagrams of an embodiment of the present invention.

Referring to FIG. 1(a), an operating-side transmitter-receiver 1 has a control input section (control key pad) 2, a liquid crystal matrix (LCD) 3 provided in the control input section 2, a liquid crystal display (LCD) 4, and an antenna 5.

Figure 1B:
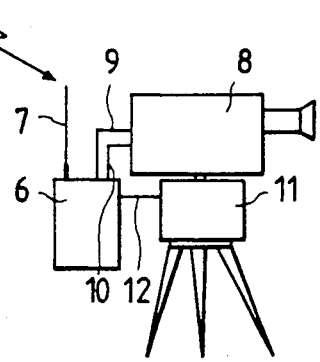

FIG. 1(b) shows a camera-side transmitter-receiver 6 having an antenna 7, a camera 8 integral with a VTR, and an electrically-driven pan head 11. The camera 8 exchanges a video signal 9 and a camera control signal 10 with the camera transmitter-receiver 6. A pan head control signal 12 is transmitted from the camera-side transmitter-receiver 6.

Figure 2A:
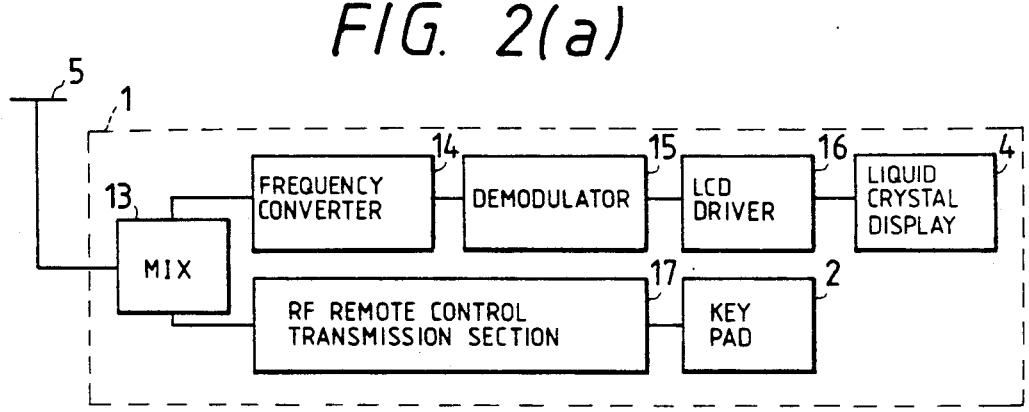
FIGS. 2(*a*) and 2(*b*) are block diagrams of the basic constructions of a remote control unit and a camera-side unit of the embodiment.

FIG. 2(a) is a block diagram of the basic construction of the remote controller unit shown in FIG. 1(a). A video signal from the camera transmitter/receiver 6 is supplied to a frequency converter 14 via the transmitting antenna 5 and a mixer (MIX) 13 and is thereby frequency-converted. The converted signal is demodulated by a demodulator 15, and information carried by this signal is displayed on the LCD 4. Input pulses from the control input section (key pad) 2 are modulated into an RF signal by an RF remote control transmission section 17, and the RF signal is emitted as electromagnetic waves (in 230 MHz band) from the antenna 5 via the MIX 13.

Figure 2B:
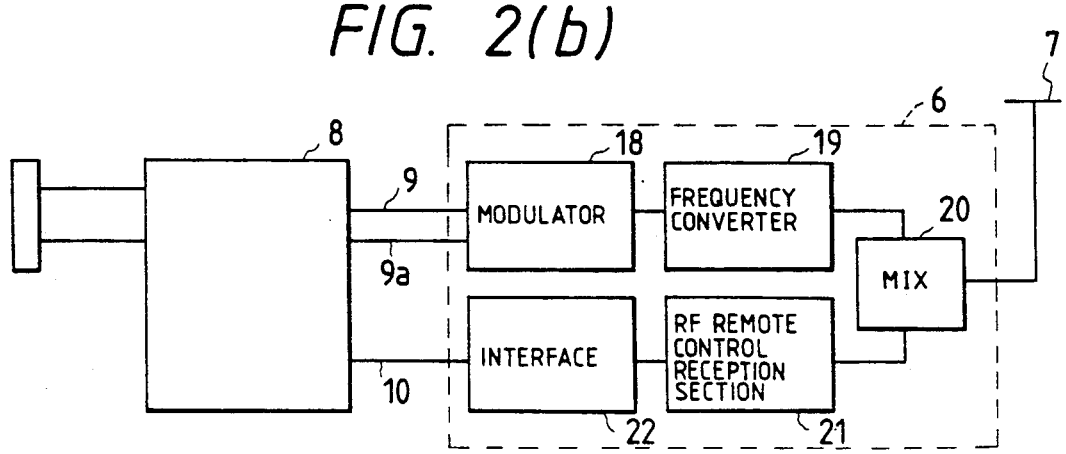

FIG. 2(b) is a block diagram of the basic construction of the camera-side unit shown in FIG. 1(b). Video signal 9 from the camera 8 and pulse data 9a on the state of the camera 8 are converted (pulse-frequency modulated) into a signal corresponding to one TV channel by a modulator 18 in the camera transmitter-receiver 6. This signal is further frequency-converted by a frequency converter 19 and is emitted as electromagnetic waves (in 300 MHz band) from the antenna 7 via a mixer (MIX) 20. Electromagnetic waves (carrying control signal) from the operating-side transmitter-receiver 1 are received by the transmitting/receiving antenna 7 and are supplied to an RF remote control reception section 21 via the MIX 20 to be demodulated. The demodulated signal is sent to the camera 8 via an interface 22.

FIG. 3 is a bock diagram of details of the remote control unit shown in FIG. 2(a). In FIG. 3, sections corresponding to these shown in FIG. 2(s) are indicated by the same reference characters. As shown in FIG. 3, the RF remote control transmission section 17 includes the control input section 2 having four control keys for supporting upward tilting (UP), downward tilting (DOWN), clockwise rotation (CW), counterclockwise rotation (CCW), tone signal oscillation circuits 31a to 31d connected to the keys of the control input section 2, a two-direction detection circuit 32 which detects a state where two of the keys are simultaneously depressed, and a time-division clock oscillation circuit 33 which oscillates to generate time-division clock based on a signal from the two-direction detection circuit 32.

Figure 5:
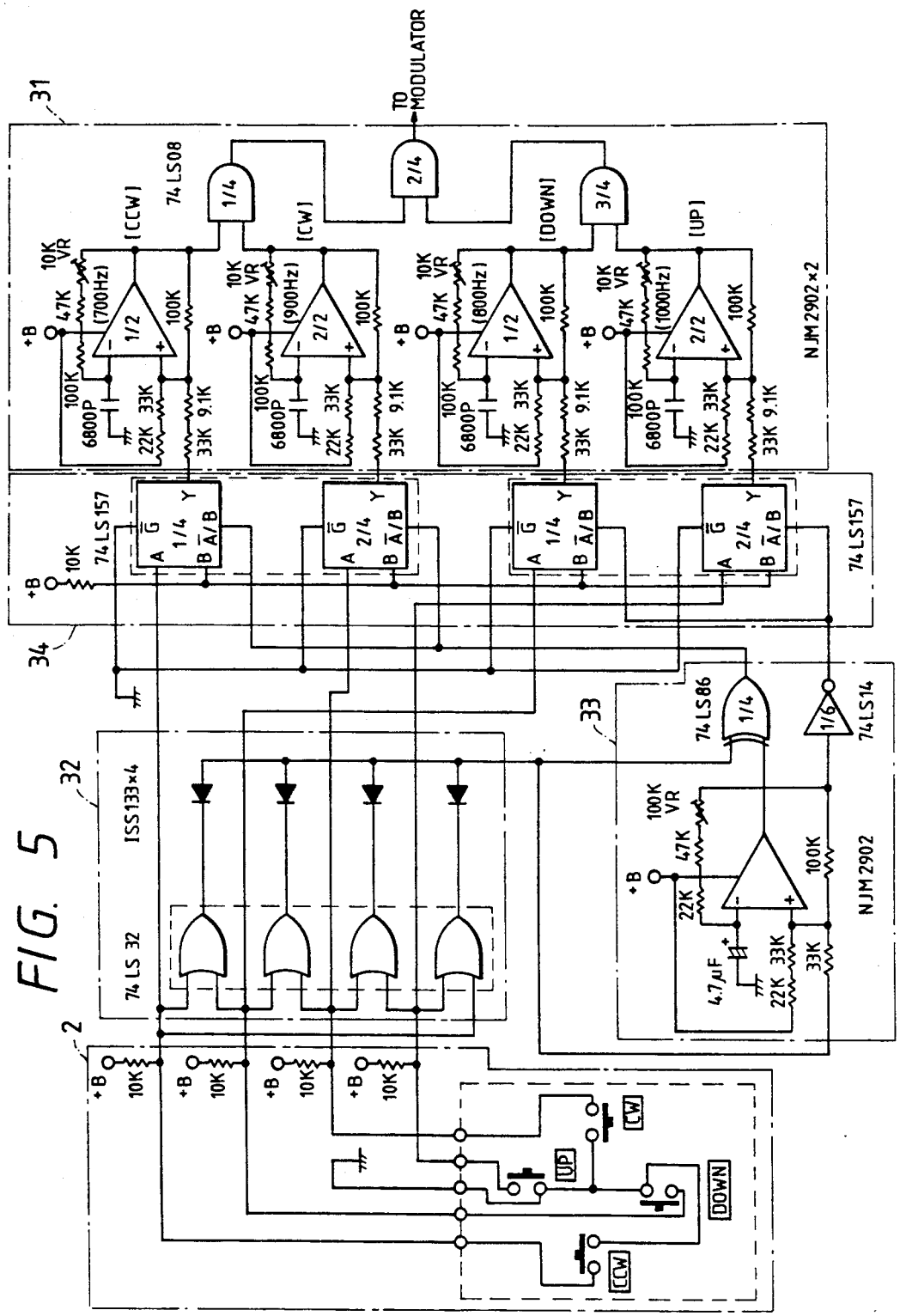
FIG. 5 is a circuit diagram of a control signal generation circuit of the remote control unit of the embodiment.

The control input section 2, the tone signal oscillation circuits 31a to 31d, the two-direction detection circuit 32 and the time-division clock oscillation circuit 33 constitute a control signal generation circuit of the control input section. More specifically, this control signal generation circuit is formed of, as shown in FIG. 5, the control input section 2, the two-direction detection circuit 32 supplied with signals from the control input section 2, the time sharing clock oscillation circuit 33 for oscillating time-division clock based on a signal from the two-direction detection circuit 32, time-division switches 34 for alternately changing over the time-division clock from the time-division clock oscillation circuit 33, and the tone signal oscillation section 31 (including four tone signal oscillation circuits 31a to 31d) supplied with signals from the control input section 2 and the time sharing clock through the time sharing switches 34. The two-direction detection circuit 32 is composed of, for example, 74LS32 and four ISS133s. The time-division clock oscillation circuit 33 is composed of NJM2902, 74LS86, 74LS14 and other components. The time-division switch 34 is composed of two 74LS157s. The tone signal oscillation section 31 is composed of two NJM2902s, 74LS08 and other components.

In the control signal generation circuit shown in FIG. 5, when only one of the four keys of the control input section 2 is depressed, all the time-division switch 34 composed of 74LS157s select the position A, so that only the tone signal oscillation circuit connected to the depressed key operates to output pulses of the assigned frequency while the other circuit are inactive.

When adjacent two of the four keys of the control input section 2 are depressed, one of the OR circuits in the two-direction detection circuit 32 is set to "L", and the time sharing clock is oscillated and output from the time-division clock generation circuit 33. The frequency of this oscillation is much lower than the frequencies of tone signals (has a longer period). Two groups of oscillation circuits, i.e., two of the tone signal oscillation circuits 31a to 31d and other two of them thereby oscillate alternately in clock cycles. If the combinations of the circuits oscillating alternately are set in correspondence with the opposed keys of the control input section 2 (i.e., UP versus DOWN, and CW versus CCW), alternative oscillation of the tone signal oscillation circuits 31a to 31d corresponding to two pairs of adjacent keys of the control input section 2 can be achieved. Consequently, two-direction simultaneous control of the four combinations of UP and CW, UP and CCW, DOWN and CW, and DOWN and CCW can be realized.

Figure 4:
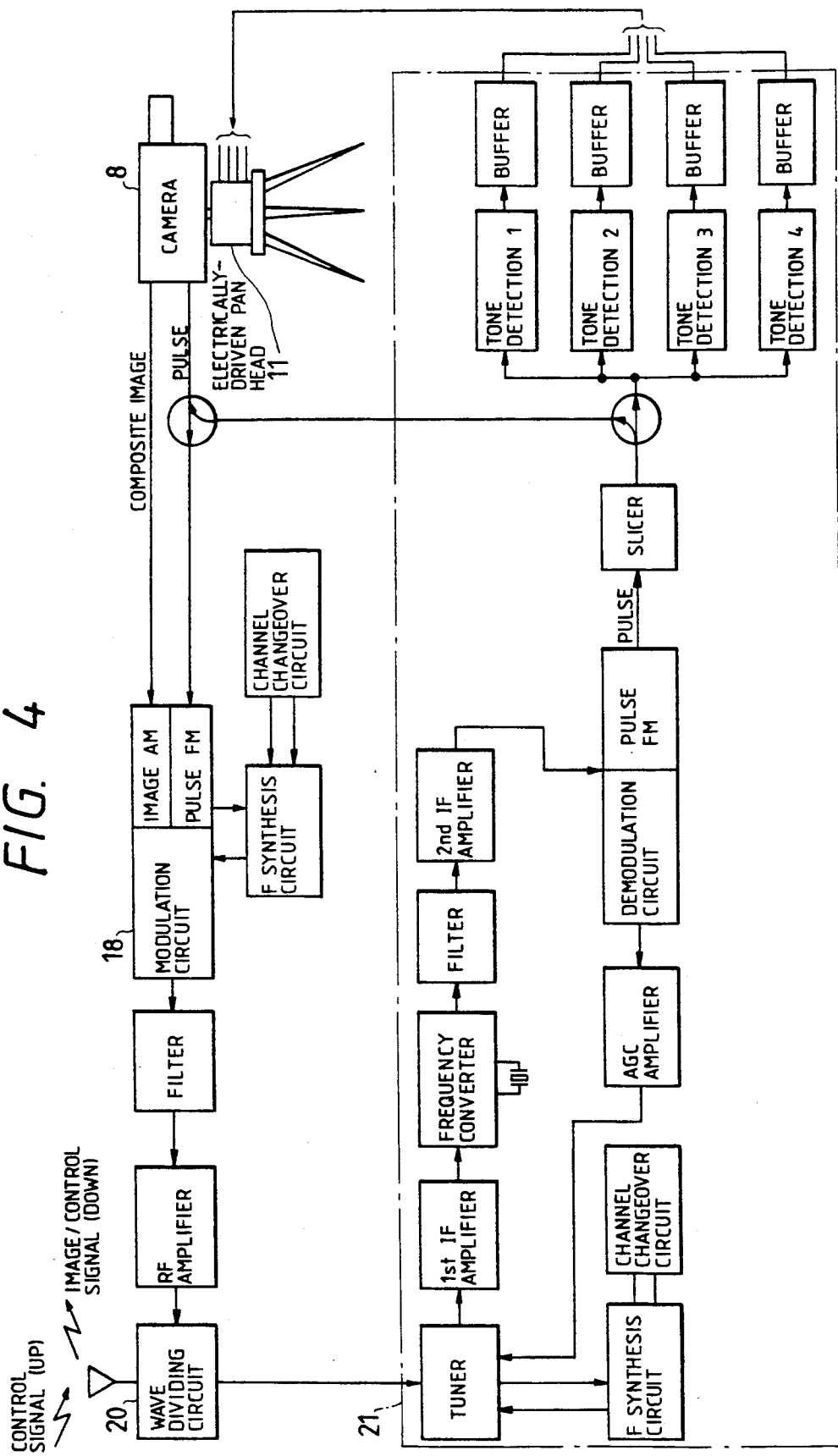
FIG. 4 is a block diagram of the remote control unit of the embodiment.
Figure 6:
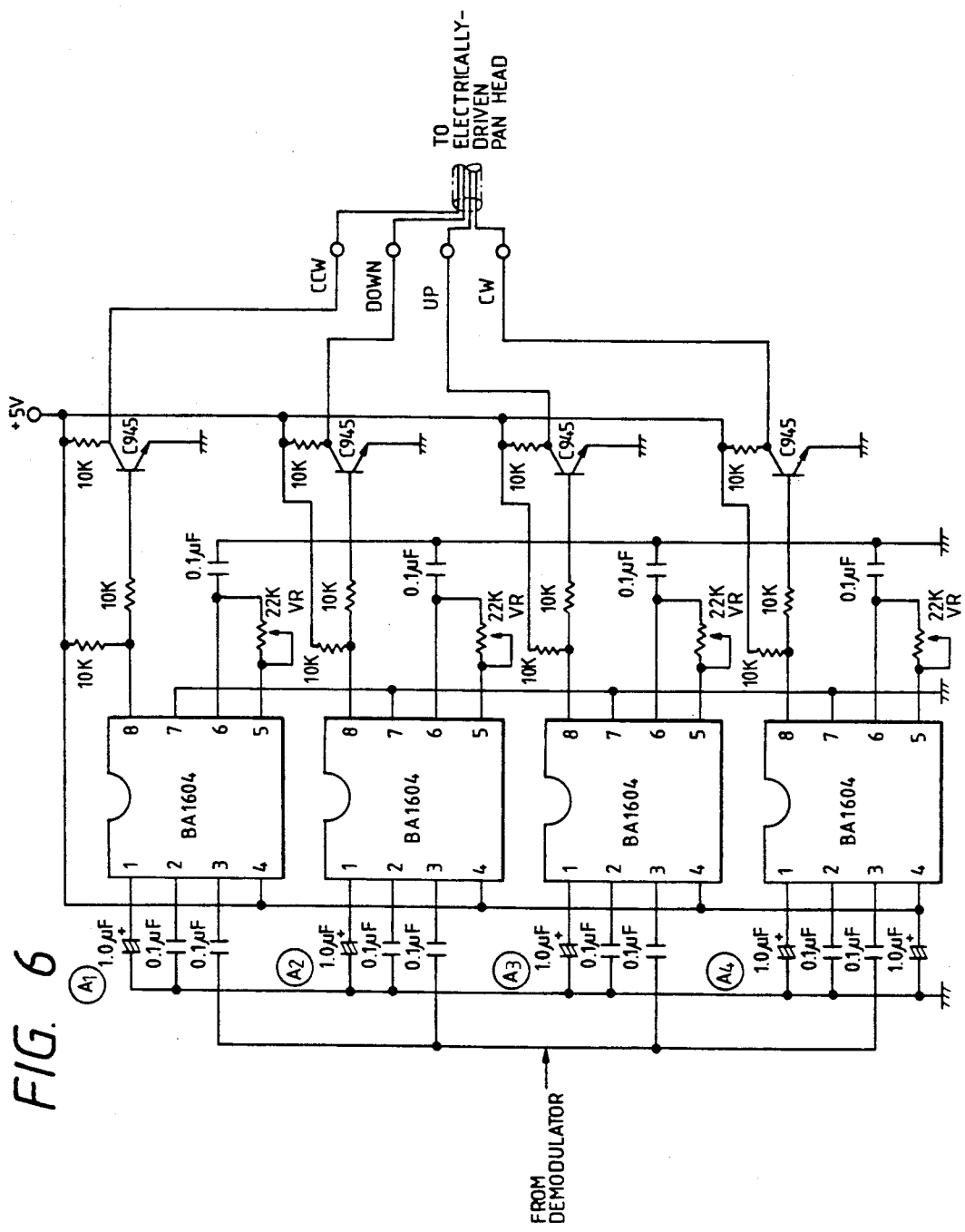
FIG. 6 is a circuit diagram of a control signal discrimination circuit of the camera-side unit.

FIG. 4 is a block diagram of details of the camera-side unit shown in FIG. 2(b). In FIG. 4, components corresponding to those shown in FIG. 2(b) are indicated by the same reference characters. The RF remote control reception section 21 shown in FIG. 4 has an electrically-driven pan head control signal discrimination section such as that shown in FIG. 6. This discrimination section includes, for example, four tone signal discrimination circuits constituted by four BA1604s or the like, as shown in FIG. 6. These four tone signal discrimination circuits are provided according to the directions of rotation of the electrically-driven pan head (UP, DOWN, CW, CCW).

When only one of the four keys of the control input section 2 shown in FIG. 5 is depressed to input a tone signal corresponding to this key, the corresponding one of the four tone signal discrimination circuits is turned on to supply a control voltage to the electrically-driven pan head.

When two of the four keys of the control input section 2 shown in FIG. 5 are simultaneously depressed to alternately input two tone pulse signals corresponding to the two keys in synchronization with the time-division clock, the corresponding tone signal discrimination circuits are alternately turned on to alternately supply a control voltages to the terminals of the electrically-driven pan head corresponding to the two directions, thus achieving two-direction simultaneous control of the electrically-driven pan head.

The embodiment with respect to wireless control of a camera integral with a VTR has been described, but the present invention is not limited to this. The present invention is applicable to all cameras which output a composite video signal and which includes a certain electrically-driven section. Specifically, the invention as defined in claim 2 can be applied not only to the electrically-drive pan head of a camera integral with VTR but also to wireless control of a simple electrically-driven device using no microcomputer.

According to the present invention, as described above, cameras including a camera integral with a VTR, and electrically-driven pan heads can be wireless-controlled, thereby avoiding restrictions on use due to the existence of a cable. Since there is no cable, endless rotation of the camera wireless-controlled can be effected.

Also, pulse data on the state of the camera is transmitted from the camera to the wireless controller. It is thereby possible to know the state of the camera precisely from a distance.

According to the invention as defined in claim 2, when only one of the first-direction and second-direction control signals is output, or when both these signals are output, the control signals are alternately oscillated in synchronization with the time-division clock, thereby enabling two-direction simultaneous control of electrically-driven device such as an electrically-driven pan head of a camera integral with a VTR.

What is claimed is:

1. An apparatus for wireless-controlling a camera, comprising:
   a camera-side transmitter-receiver for modulating and transmitting an image signal from the camera and pulse data on the state of the camera, receiving and demodulating a signal transmitted from an operating-side transmitter-receiver, and supplying the signal demodulated to the camera and an electrically-driven pan head on which the camera is mounted; and
   said operating-side transmitter-receiver for modulating and transmitting a control signal based on an input from a control input section, receiving and demodulating a signal transmitted from said camera-side transmitter-receiver, and supplying the signal demodulated to a display on the operating side.

2. An apparatus for effecting two-direction simultaneous control of an electrically-driven device, comprising:
   a control input section for outputting a first-direction control signal and a second-direction control signal;
   two-direction detection means for outputting a detection signal representing that the first-direction and second-direction control signals are simultaneously output from said control input section, when this situation occurs;
   a time-division clock oscillator for oscillating time-division clock when supplied with the output from said two-direction detection means;
   a tone pulse oscillator supplied with the first-direction and second-direction control signals from said control input section, said tone pulse oscillator outputting tone pulse signals corresponding to the supplied control signals in synchronization with the clock from the time-division clock oscillator; and
   tone pulse signal discrimination means supplied with the tone pulse signals from said tone pulse oscillator, said tone pulse signal discrimination means supplying the electrically-driven device with control voltages corresponding to the supplied tone pulse signals.

* * * * *